(12) United States Patent
Kim et al.

(10) Patent No.: US 9,887,818 B2
(45) Date of Patent: Feb. 6, 2018

(54) METHOD AND APPARATUS FOR TRANSRECEIVING CHANNEL STATE INFORMATION IN WIRELESS COMMUNICATION SYSTEM

(71) Applicant: LG ELECTRONICS INC., Seoul (KR)

(72) Inventors: Hyungtae Kim, Seoul (KR); Jonghyun Park, Seoul (KR); Hanbyul Seo, Seoul (KR)

(73) Assignee: LG ELECTRONICS INC., Seoul (KR)

(*) Notice: Subject to any disclaimer, the term of this patent is extended or adjusted under 35 U.S.C. 154(b) by 143 days.

(21) Appl. No.: 14/893,501

(22) PCT Filed: Jul. 25, 2014

(86) PCT No.: PCT/KR2014/006808
§ 371 (c)(1),
(2) Date: Nov. 23, 2015

(87) PCT Pub. No.: WO2015/012637
PCT Pub. Date: Jan. 29, 2015

(65) Prior Publication Data
US 2016/0119099 A1 Apr. 28, 2016

Related U.S. Application Data

(60) Provisional application No. 61/858,631, filed on Jul. 26, 2013.

(51) Int. Cl.
*H04L 5/00* (2006.01)
*H04W 72/04* (2009.01)

(52) U.S. Cl.
CPC .......... *H04L 5/0048* (2013.01); *H04L 5/0057* (2013.01); *H04L 5/0073* (2013.01); *H04W 72/0446* (2013.01)

(58) Field of Classification Search
CPC ... H04L 5/0048; H04L 5/0057; H04L 5/0073; H04B 1/7097
(Continued)

(56) References Cited

U.S. PATENT DOCUMENTS 9,456,372 B2 * 9/2016 Lee ..................... H04L 25/0226
2011/0243066 A1 * 10/2011 Nayeb Nazar ........ H04L 1/007
370/328

(Continued)

FOREIGN PATENT DOCUMENTS

KR 10-2011-0108284 10/2011
KR 10-2012-0120317 11/2012

OTHER PUBLICATIONS

Huawei, et al., "PDSCH RE mapping with IMRs and ZP CSI-RS," 3GPP TSG RAN WG1 Meeting #71, R1-124690, Nov. 2012, 4 pages.

(Continued)

*Primary Examiner* — Afsar M Qureshi
(74) *Attorney, Agent, or Firm* — Lee Hong Degerman Kang & Waimey

(57) ABSTRACT

The present invention relates to a wireless communication system. A method for a terminal reporting channel state information (CSI) in a wireless communication system, according to one embodiment of the present invention, comprises the steps of: receiving, from a second cell, which is a serving cell and neighboring a first cell, resource block allocation information related to downlink data of the second cell; selecting, based on the resource block allocation information, either a first interface measurement resource (IMR) in which interference from the second cell is present or a second IMR in which interference from the second cell (Continued)

US 9,887,818 B2

Page 2 is absent; and transmitting, to the first cell, a channel quality indicator (CQI) calculated based on the IMR which has been selected.

12 Claims, 11 Drawing Sheets

(58) Field of Classification Search
USPC .......................................................... 370/329
See application file for complete search history.

(56) References Cited

U.S. PATENT DOCUMENTS

| | | | | |
|---|---|---|---|---|
| 2012/0257524 | A1* | 10/2012 | Chen | H04W 24/10 370/252 |
| 2013/0182676 | A1* | 7/2013 | Lee | H04L 1/0027 370/329 |
| 2013/0194982 | A1* | 8/2013 | Fwu | H04W 72/0493 370/280 |
| 2013/0208604 | A1* | 8/2013 | Lee | H04L 25/0226 370/252 |
| 2013/0215819 | A1* | 8/2013 | Ji | H04L 5/0053 370/315 |
| 2013/0258965 | A1* | 10/2013 | Geirhofer | H04W 72/048 370/329 |
| 2014/0036706 | A1* | 2/2014 | Mondal | H04W 24/08 370/252 |
| 2014/0092760 | A1* | 4/2014 | Geirhofer | H04W 24/10 370/252 |
| 2015/0063231 | A1* | 3/2015 | Seo | H04L 5/0044 370/329 |
| 2015/0215022 | A1* | 7/2015 | Nagata | H04L 5/001 370/329 |
| 2015/0263796 | A1* | 9/2015 | Nam | H04B 7/0417 370/329 |

OTHER PUBLICATIONS

Mediatek Inc., "Interference measurement and IMR configuration," 3GPP TSG RAN WG1 Meeting #70, R1-123333, Aug. 2012, 4 pages.
Samsung, "Discussion on introducing CoMP in 36.331," 3GPP TSG-RAN2 #79-bis meeting, R2-124643, Oct. 2012, 6 pages.
PCT International Application No. PCT/KR2014/006808, Written Opinion of the International Searching Authority dated Nov. 13, 2014, 13 pages.
PCT International Application No. PCT/KR2014/006808, Written Opinion of the International Searching Authority dated Nov. 13, 2014, 19 pages.

* cited by examiner

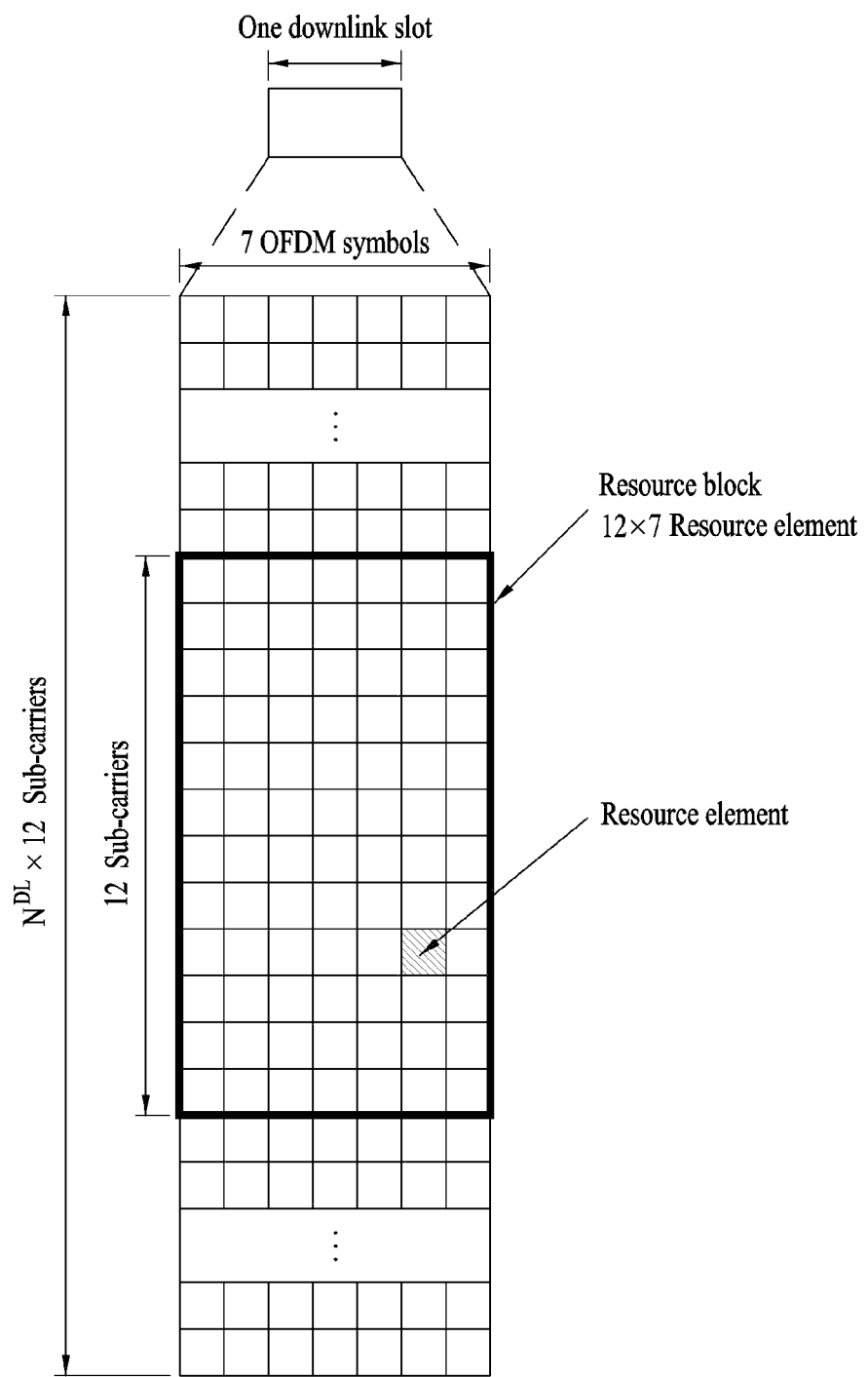

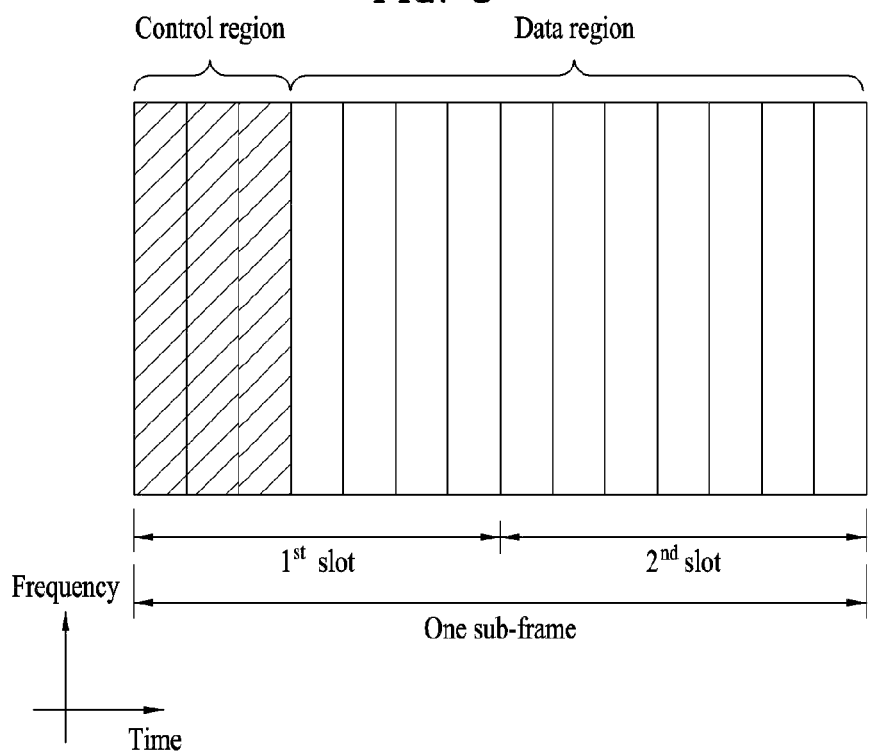
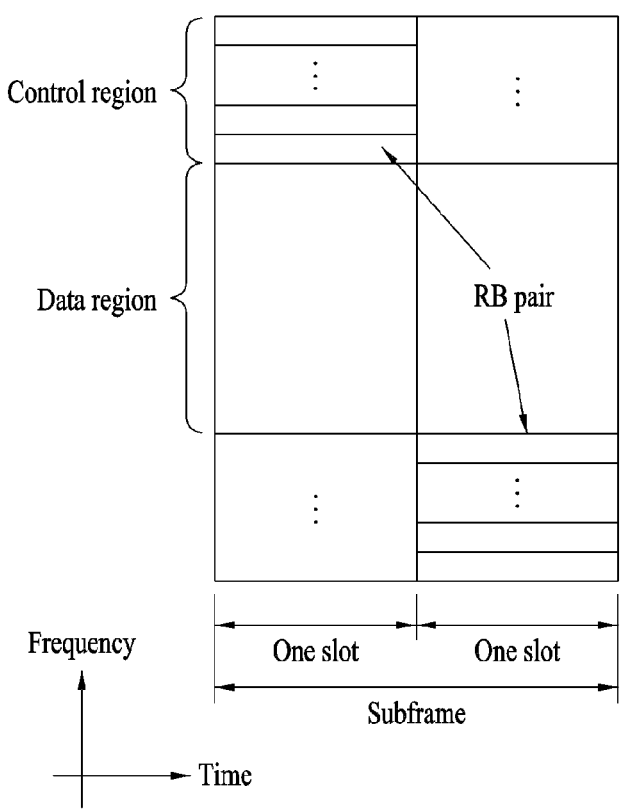

FIG. 5
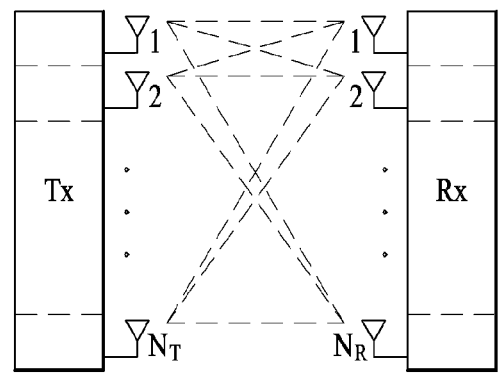
(a)
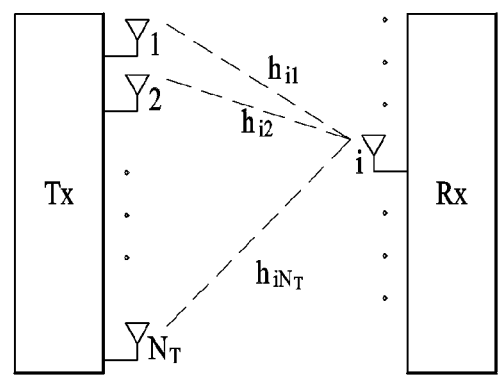
(b)

METHOD AND APPARATUS FOR TRANSRECEIVING CHANNEL STATE INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2014/006808, filed on Jul. 25, 2014, which claims the benefit of U.S. Provisional Application No. 61/858,631, filed on Jul. 26, 2013, the contents of which are all hereby incorporated by reference herein in their entirety.

TECHNICAL FIELD

The present invention relates to a wireless communication system, and more particularly, to a method for a user equipment to receive resource block assignment information on downlink data of a second cell from the second cell adjacent to a first cell corresponding to a serving cell and to report channel state information (CSI) through feedback by reflecting information necessary for coordination between base stations in the CSI using the received resource block assignment information and apparatus for the same.

BACKGROUND ART

Multiple input multiple output (MIMO) increases the efficiency of data transmission and reception using multiple transmit antennas and multiple receive antennas instead of a single transmission antenna and a single reception antenna. A receiver receives data through multiple paths when multiple antennas are used, whereas the receiver receives data through a single antenna path when a single antenna is used. Accordingly, MIMO can increase a data transmission rate and throughput and improve coverage.

A single cell MIMO scheme can be classified into a single user-MIMO (SU-MIMO) scheme for receiving a downlink signal by a single UE in one cell and a multi user-MIMO (MU-MIMO) scheme for receiving a downlink signal by two or more UEs.

Research on coordinated multi-point (CoMP) for improving throughput of a UE located at a cell boundary by applying improved MIMO to a multi-cell environment is actively performed. The CoMP system can decrease inter-cell interference in a multi-cell environment and improve system performance.

Channel estimation refers to a procedure for compensating for signal distortion due to fading to restore a reception signal. Here, the fading refers to sudden fluctuation in signal intensity due to multipath-time delay in a wireless communication system environment. For channel estimation, a reference signal (RS) known to both a transmitter and a receiver is required. In addition, the RS can be referred to as a RS or a pilot signal according to applied standard.

A downlink RS is a pilot signal for coherent demodulation for a physical downlink shared channel (PDSCH), a physical control format indicator channel (PCFICH), a physical hybrid indicator channel (PHICH), a physical downlink control channel (PDCCH), etc. A downlink RS includes a common RS (CRS) shared by all user equipments (UEs) in a cell and a dedicated RS (DRS) for a specific UE. For a system (e.g., a system having extended antenna configuration LTE-A standard for supporting 8 transmission antennas) compared with a conventional communication system (e.g., a system according to LTE release-8 or 9) for supporting 4 transmission antennas, DRS based data demodulation has been considered for effectively managing RSs and supporting a developed transmission scheme. That is, for supporting data transmission through extended antennas, DRS for two or more layers can be defined. DRS is pre-coded by the same pre-coder as a pre-coder for data and thus a receiver can easily estimate channel information for data demodulation without separate precoding information.

A downlink receiver can acquire pre-coded channel information for extended antenna configuration through DRS but requires a separate RS other than DRS in order to non-pre-coded channel information. Accordingly, a receiver of a system according to LTE-A standard can define a RS for acquisition of channel state information (CSI), that is, CSI-RS.

DISCLOSURE OF THE INVENTION

Technical Task

Based on the aforementioned discussion, an object of the present invention is to provide a method and device for transmitting and receiving channel state information in a wireless communication system.

Another technical task of the present invention is to provide a method for UE to perform feedback by reflecting information necessary for coordination between base stations in CSI in a wireless communication system supportive of cooperative transmission in case that backhaul delay is large.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

In a first technical aspect of the present invention, provided herein is a method of reporting channel state information (CSI) by a user equipment in a wireless communication system, including the steps of receiving resource block assignment information on downlink data of a second cell from the second cell adjacent to a first cell corresponding to a serving cell, selecting either a first IMR (interference measurement resource) having interference from the second cell or a second IMR without the interference from the second cell based on the resource block assignment information, and transmitting a CQI (channel quality indicator) calculated based on the selected IMR to the first cell.

In a second technical aspect of the present invention, provided herein is a user equipment, which reports channel state information (CSI) in a wireless communication system, including a radio frequency (RF) unit and a processor configured to receive resource block assignment information on downlink data of a second cell from the second cell adjacent to a first cell corresponding to a serving cell, the processor configured to select either a first IMR (interference measurement resource) having interference from the second cell and a second IMR without the interference from the second cell based on the resource block assignment information, the processor configured to transmit a CQI (channel quality indicator) calculated based on the selected IMR to the first cell.

The following matters may be included in the first and second technical aspects of the present invention.

The method may further include the step of receiving DCI (downlink control information) including a 1-bit flag, wherein if the 1-bit flag corresponds to a first value, a remaining payload of the DCI may include the resource block assignment information and wherein if the 1-bit flag corresponds to a second value, the remaining payload of the DCI may include scheduling information.

The step of transmitting indication information on presence or non-presence of muting of the second cell to the first cell may be further included.

The indication information may be transmitted in a same subframe as the CQI.

The resource block assignment information may be determined as either first pattern information to transmit data only in an even-numbered resource block and to perform muting on an odd-numbered resource block or a second pattern information to transmit the data only in the odd-numbered resource block and to perform the muting on the even-numbered resource block.

The resource block assignment information may be received through EPDCCH (enhanced physical downlink control channel).

After a second PMI is received from the second cell, the second PMI may be transmitted to the first cell through a first PUSCH (physical uplink shared channel).

Effects obtainable from the present invention are non-limited by the above mentioned effects. And, other unmentioned effects can be clearly understood from the following description by those having ordinary skill in the technical field to which the present invention pertains.

Advantageous Effects

According to an embodiment of the present invention, channel state information can be efficiently transceived in a wireless communication system.

According to an embodiment of the present invention, a method for UE to provide feedback by reflecting information necessary for coordination between base stations in CSI in a wireless communication system supportive of cooperative transmission in case of a large backhaul delay can be provided.

Effects obtainable from the present invention are non-limited by the above mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a diagram illustrating an example of a resource grid for one downlink slot.

FIG. 3 is a diagram illustrating a structure of a downlink subframe.

FIG. 4 is a diagram illustrating a structure of an uplink subframe.

FIG. 5 is a schematic diagram illustrating a wireless communication system having multiple antennas.

BEST MODE FOR INVENTION

Figure 1:
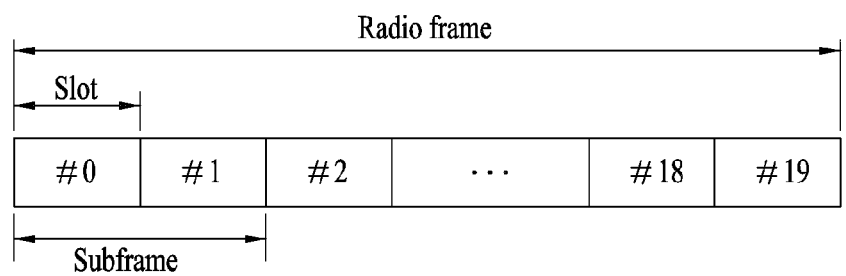
FIG. 1 is a diagram illustrating an example of a structure of a downlink radio frame.

The embodiments described below correspond to predetermined combinations of elements and features and characteristics of the present invention. Moreover, unless mentioned otherwise, the characteristics of the present invention may be considered as optional features of the present invention. Herein, each element or characteristic of the present invention may also be operated or performed without being combined with other elements or characteristics of the present invention. Alternatively, the embodiment of the present invention may be realized by combining some of the elements and/or characteristics of the present invention. Additionally, the order of operations described according to the embodiment of the present invention may be varied. Furthermore, part of the configuration or characteristics of any one specific embodiment of the present invention may also be included in (or shared by) another embodiment of the present invention, or part of the configuration or characteristics of any one embodiment of the present invention may replace the respective configuration or characteristics of another embodiment of the present invention.

In the description of the present invention, the embodiments of the present invention will be described by mainly focusing on the data transmission and reception relation between a base station and a user equipment. Herein, the base station may refer to a terminal node of the network that performs direct communication with the user equipment (or user terminal). In the description of the present invention, particular operations of the present invention that are described as being performed by the base station may also be performed by an upper node of the base station.

More specifically, in a network consisting of multiple network nodes including the base station, diverse operations that are performed in order to communicate with the terminal (or user equipment) may be performed by the base station or network nodes other than the base station. Herein, the term 'Base Station (BS)' may be replaced by other terms, such as fixed station, Node B, eNode B (eNB), ABS (Advanced Base Station), or Access Point (AP). Relay may be replaced by other terms, such as Relay Node (RN), Relay Station (RS), and so on. Furthermore, 'Terminal' may be replaced by other terms, such as UE (User Equipment), MS (Mobile Station), MSS (Mobile Subscriber Station), SS (Subscriber Station), and so on.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through wireless (or radio) technology such as universal terrestrial radio access (UTRA) or CDMA2000. TDMA may be embodied through wireless (or radio) technology such as global system for mobile communication (GSM)/general packet radio service (GPRS)/enhanced data rates for GSM evolution (EDGE). OFDMA may be embodied through wireless (or radio) technology such as institute of electrical and electronics engineers (IEEE) 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on IEEE 802.11 systems. However, technical features of the present invention are not limited thereto.

With reference to FIG. 1, the structure of a downlink radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1 illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

The above-described radio frame structures are purely exemplary and thus it is to be noted that the number of subframes in a radio frame, the number of slots in a subframe, or the number of symbols in a slot may vary.

FIG. 2 illustrates the structure of a downlink resource grid for the duration of one downlink slot. FIG. 2 corresponds to a case in which an OFDM includes normal CP. Referring to FIG. 2, a downlink slot includes a plurality of OFDM symbols in the time domain and includes a plurality of RBs in the frequency domain. Here, one downlink slot includes 7 OFDM symbols in the time domain and an RB includes 12 subcarriers in the frequency domain, which does not limit the scope and spirit of the present invention. An element on a resource grid is referred to as a resource element (RE). For example, RE a(k,l) refers to RE location in a kth subcarrier and a first OFDM symbol. In the case of the normal CP, one RB includes 12×7 REs (in the case of the extended CP, one RB includes 12×6 REs). An interval between subcarriers is 15 kHz and thus one RB includes about 180 kHz in the frequency domain. NDL is number of RBs in a downlink slot. NDL depends on a downlink transmission bandwidth configured by BS scheduling.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. A basic unit of transmission is one subframe. That is, a PDCCH and a PDSCH are allocated across two slots. Downlink control channels used in the 3GPP LTE system include, for example, a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. When the PDCCH is directed to a specific UE, its CRC may be masked by a cell-RNTI (C-RNTI) of the UE. When the PDCCH is for a paging message, the CRC of the PDCCH may be masked by a paging indicator identifier (P-RNTI). When the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

FIG. 4 illustrates the structure of an uplink subframe. An uplink subframe may be divided into a control region and a data region in the frequency domain. A Physical Uplink Control Channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Modeling of MIMO System

A multiple input multiple output (MIMO) system increases transmission/reception efficiency of data using multiple transmission (Tx) antennas and multiple reception (Rx) antennas. MIMO technology does not depend upon a single antenna path in order to receive all messages but instead can combine a plurality of data fragments received through a plurality of antennas and receive all data.

MIMO technology includes a spatial diversity scheme, a spatial multiplexing scheme, etc. The spatial diversity scheme can increase transmission reliability or can widen a cell diameter with diversity gain and thus is appropriate for data transmission of a UE that moves a high speed. The spatial multiplexing scheme can simultaneously transmit different data so as to increase data transmission rate without increase in a system bandwidth.

FIG. 5 illustrates the configuration of a MIMO communication system having multiple antennas. As illustrated in FIG. 5(a), the simultaneous use of a plurality of antennas at both the transmitter and the receiver increases a theoretical channel transmission capacity, compared to use of a plurality of antennas at only one of the transmitter and the receiver. Therefore, transmission rate may be increased and frequency efficiency may be remarkably increased. As channel transmission rate is increased, transmission rate may be increased, in theory, to the product of a maximum transmission rate Ro that may be achieved with a single antenna and a transmission rate increase Ri.

$$R_i = \min(N_T, N_R) \qquad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation wireless local area network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system will be described in detail through mathematical modeling. It is assumed that NT Tx antennas and NR Rx antennas are present in the system.

Regarding a transmission signal, up to NT pieces of information can be transmitted through the NT Tx antennas, as expressed in Equation 2 below.

$$s = [s_1, s_2, \ldots, s_{N_T}]^T \qquad \text{[Equation 2]}$$

A different transmission power may be applied to each piece of transmission information, $s_1, s_2, \ldots, s_{N_T}$. Let the transmission power levels of the transmission information be denoted by $P_1, P_2, \ldots, P_{N_T}$, respectively. Then the transmission power-controlled transmission information vector is given as $$\hat{s} = [\hat{s}_1, \hat{s}_2, \ldots, \hat{s}_{N_T}]^T = [P_1 s_1, P_2 s_2, \ldots, P_{N_T} s_{N_T}]^T \qquad \text{[Equation 3]}$$

The transmission power-controlled transmission information vector ŝ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

NT transmission signals $x_1, x_2, \ldots, x_{N_T}$ may be generated by multiplying the transmission power-controlled information vector ŝ by a weight matrix W. The weight matrix W functions to appropriately distribute the transmission information to the Tx antennas according to transmission channel states, etc. These NT transmission signals $x_1, x_2, \ldots, x_{N_T}$ are represented as a vector x, which may be determined by Equation 5 below.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \ldots & w_{1N_T} \\ w_{21} & w_{22} & \ldots & w_{2N_T} \\ \vdots & & \ddots & \\ w_{i1} & w_{i2} & \ldots & w_{iN_T} \\ \vdots & & & \ddots \\ w_{N_T1} & w_{N_T2} & \ldots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} =$$ [Equation 5]

$$W\hat{s} = WPs$$

Here, $W_{ij}$ refers to a weight between an ith Tx antenna and jth information.

A reception signal x may be considered in different ways according to two cases (e.g., spatial diversity and spatial multiplexing). In the case of spatial multiplexing, different signals are multiplexed and the multiplexed signals are transmitted to a receiver, and thus, elements of information vector (s) have different values. In the case of spatial diversity, the same signal is repeatedly transmitted through a plurality of channel paths and thus elements of information vectors (s) have the same value. A hybrid scheme of spatial multiplexing and spatial diversity can also be considered. That is, that same signal may be transmitted through three Tx antennas and the remaining signals may be spatial-multiplexed and transmitted to a receiver.

In the case of NR Rx antennas, a reception signal of each antenna may be expressed as the vector shown in Equation 6 below.

$$y = [y_1, y_2, \ldots, y_{N_R}]^T$$ [Equation 6]

When a channel modeling is executed in the MIMO communication system, individual channels can be distinguished from each other according to transmission/reception (Tx/Rx) antenna indexes. A channel passing the range from a Tx antenna j to an Rx antenna i is denoted by hij. It should be noted that the index order of the channel hij is located before a reception (Rx) antenna index and is located after a transmission (Tx) antenna index.

FIG. 5(b) illustrates channels from NT Tx antennas to an Rx antenna i. The channels may be collectively represented in the form of vector and matrix. Referring to FIG. 5(b), the channels passing the range from the NT Tx antennas to the Rx antenna i can be represented by the Equation 7 below.

$$h_i^T = [h_{i1}, h_{i2}, \ldots, h_{iN_T}]$$ [Equation 7]

All channels passing the range from the NT Tx antennas to NR Rx antennas are denoted by the matrix shown in Equation 8 below.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_t} \\ \vdots & & & \ddots \\ h_{N_R1} & h_{N_R2} & \ldots & h_{N_RN_T} \end{bmatrix}$$ [Equation 8]

Additive white Gaussian noise (AWGN) is added to an actual channel which has passed the channel matrix. The AWGN (n1, n2, ..., nNR) added to each of NR reception (Rx) antennas can be represented by Equation 9 below.

$$n = [n_1, n_2, \ldots, n_{N_R}]^T$$ [Equation 9]

A reception signal calculated by the above-mentioned equations can be represented by Equation 10 below.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_t} \\ \vdots & & & \ddots \\ h_{N_R1} & h_{N_R2} & \ldots & h_{N_RN_T} \end{bmatrix} \begin{bmatrix} x_1 \\ x_2 \\ \vdots \\ x_i \\ \vdots \\ x_{N_T} \end{bmatrix} + \begin{bmatrix} n_1 \\ n_2 \\ \vdots \\ n_i \\ \vdots \\ n_{N_R} \end{bmatrix} =$$ [Equation 10]

$$Hx + n$$

The number of rows and the number of columns of a channel matrix H indicating a channel condition are determined by the number of Tx/Rx antennas. In the channel matrix H, the number of rows is equal to the number (NR) of Rx antennas, and the number of columns is equal to the number (NT) of Tx antennas. Namely, the channel matrix H is denoted by an NR×NT matrix.

The rank of a matrix is defined as the smaller between the number of independent rows and the number of independent columns in the channel matrix. Accordingly, the rank of the channel matrix is not larger than the number of rows or columns of the channel matrix. The rank of a channel matrix H, rank(H) satisfies the following constraint.

$$\text{rank}(H) \leq \min(N_T, N_R)$$ [Equation 11]

For MIMO transmission, 'rank' indicates the number of paths for independent transmission of signals and 'number of layers' indicates the number of streams transmitted through each path. In general, a transmission end transmits layers, the number of which corresponds to the number of ranks used for signal transmission, and thus, rank have the same meaning as number of layers unless there is no different disclosure.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the reception signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs in a mobile communication system may be divided into two types according to their purposes: RS for channel information acquisition and RS for data demodulation. Since its purpose lies in that a UE acquires downlink channel information, the former should be transmitted in a broad band and received and measured even by a UE that does not receive downlink data in a specific subframe. This RS is also used in a situation like handover. The latter is an RS that an eNB transmits along with downlink data in specific resources. A UE can estimate a channel by receiving the RS and accordingly can demodulate data. The RS should be transmitted in a data transmission area.

A legacy 3GPP LTE (e.g., 3GPP LTE release-8) system defines two types of downlink RSs for unicast services: a common RS (CRS) and a dedicated RS (DRS). The CRS is used for acquisition of information about a channel state, measurement of handover, etc. and may be referred to as a cell-specific RS. The DRS is used for data demodulation and may be referred to as a UE-specific RS. In a legacy 3GPP LTE system, the DRS is used for data demodulation only and the CRS can be used for both purposes of channel information acquisition and data demodulation.

CRSs, which are cell-specific, are transmitted across a wideband in every subframe. According to the number of Tx antennas at an eNB, the eNB may transmit CRSs for up to four antenna ports. For instance, an eNB with two Tx antennas transmits CRSs for antenna port 0 and antenna port 1. If the eNB has four Tx antennas, it transmits CRSs for respective four Tx antenna ports, antenna port 0 to antenna port 3.

Figure 6:
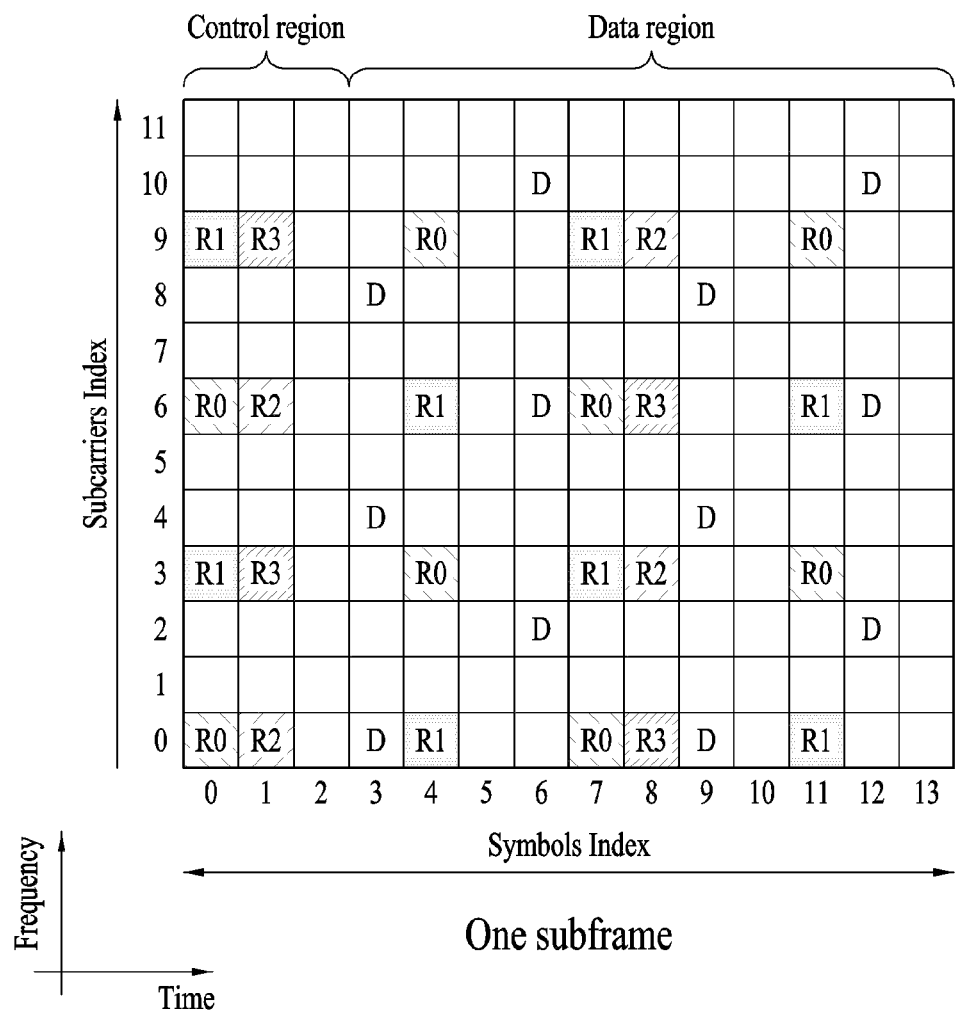
FIG. 6 is a diagram illustrating legacy CRS and DRS patterns.

FIG. 6 illustrates a CRS and DRS pattern for an RB (including 14 OFDM symbols in time by 12 subcarriers in frequency in case of a normal CP) in a system where an eNB has four Tx antennas. In FIG. 6, REs labeled with 'R0', 'R1', 'R2' and 'R3' represent the positions of CRSs for antenna port 0 to antenna port 4, respectively. REs labeled with 'D' represent the positions of DRSs defined in the LTE system.

The LTE-A system, an evolution of the LTE system, can support up to eight Tx antennas. Therefore, it should also support RSs for up to eight Tx antennas. Because downlink RSs are defined only for up to four Tx antennas in the LTE system, RSs should be additionally defined for five to eight Tx antenna ports, when an eNB has five to eight downlink Tx antennas in the LTE-A system. Both RSs for channel measurement and RSs for data demodulation should be considered for up to eight Tx antenna ports.

One of significant considerations for design of the LTE-A system is backward compatibility. Backward compatibility is a feature that guarantees a legacy LTE terminal to operate normally even in the LTE-A system. If RSs for up to eight Tx antenna ports are added to a time-frequency area in which CRSs defined by the LTE standard are transmitted across a total frequency band in every subframe, RS overhead becomes huge. Therefore, new RSs should be designed for up to eight antenna ports in such a manner that RS overhead is reduced.

Largely, new two types of RSs are introduced to the LTE-A system. One type is CSI-RS serving the purpose of channel measurement for selection of a transmission rank, a modulation and coding scheme (MCS), a precoding matrix index (PMI), etc. The other type is demodulation RS (DM RS) for demodulation of data transmitted through up to eight Tx antennas.

Compared to the CRS used for both purposes of measurement such as channel measurement and measurement for handover and data demodulation in the legacy LTE system, the CSI-RS is designed mainly for channel estimation, although it may also be used for measurement for handover. Since CSI-RSs are transmitted only for the purpose of acquisition of channel information, they may not be transmitted in every subframe, unlike CRSs in the legacy LTE system. Accordingly, CSI-RSs may be configured so as to be transmitted intermittently (e.g. periodically) along the time axis, for reduction of CSI-RS overhead.

When data is transmitted in a downlink subframe, DM RSs are also transmitted dedicatedly to a UE for which the data transmission is scheduled. Thus, DM RSs dedicated to a particular UE may be designed such that they are transmitted only in a resource area scheduled for the particular UE, that is, only in a time-frequency area carrying data for the particular UE.

Figure 7:
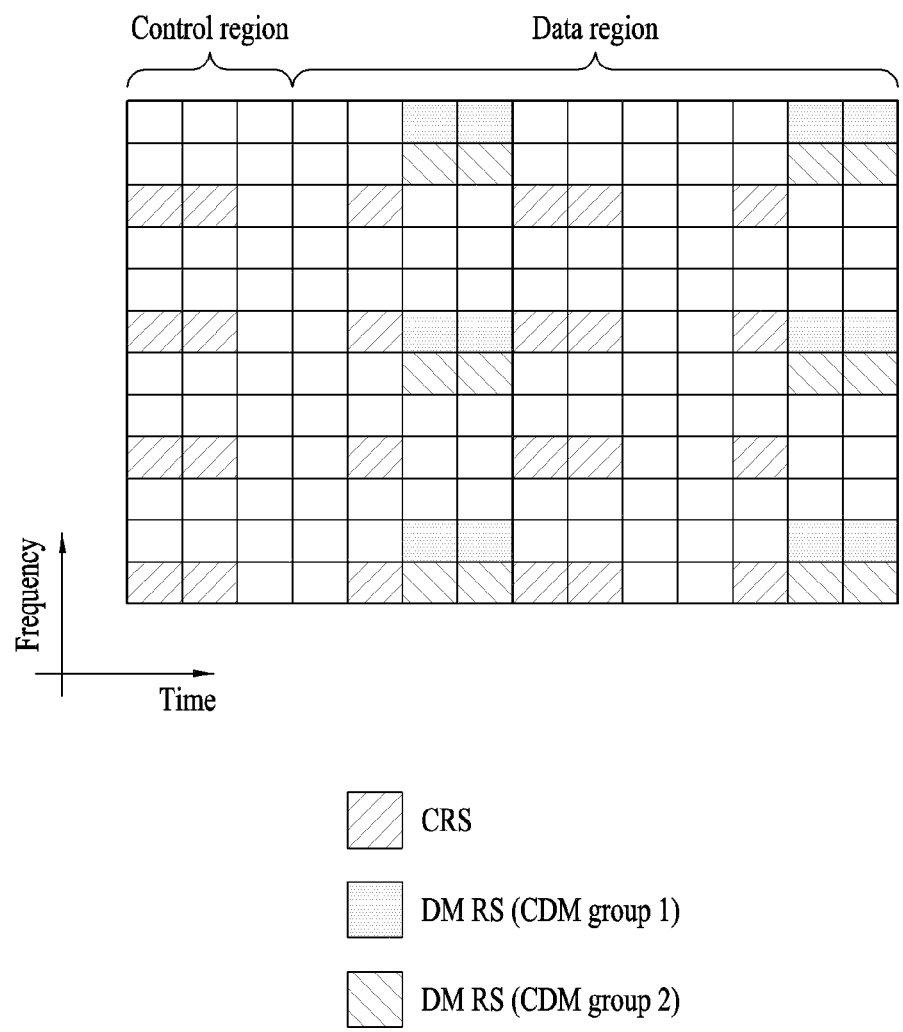
FIG. 7 is a diagram illustrating an example of a DM RS pattern.

FIG. 7 illustrates an exemplary DM RS pattern defined for the LTE-A system. In FIG. 7, the positions of REs carrying DM RSs in an RB carrying downlink data (an RB having 14 OFDM symbols in time by 12 subcarriers in frequency in case of a normal CP) are marked. DM RSs may be transmitted for additionally defined four antenna ports, antenna port 7 to antenna port 10 in the LTE-A system. DM RSs for different antenna ports may be identified by their different frequency resources (subcarriers) and/or different time resources (OFDM symbols). This means that the DM RSs may be multiplexed in frequency division multiplexing (FDM) and/or time division multiplexing (TDM). If DM RSs for different antenna ports are positioned in the same time-frequency resources, they may be identified by their different orthogonal codes. That is, these DM RSs may be multiplexed in Code Division Multiplexing (CDM). In the illustrated case of FIG. 7, DM RSs for antenna port 7 and antenna port 8 may be located on REs of DM RS CDM group 1 through multiplexing based on orthogonal codes. Similarly, DM RSs for antenna port 9 and antenna port 10 may be located on REs of DM RS CDM group 2 through multiplexing based on orthogonal codes.

Figure 8:
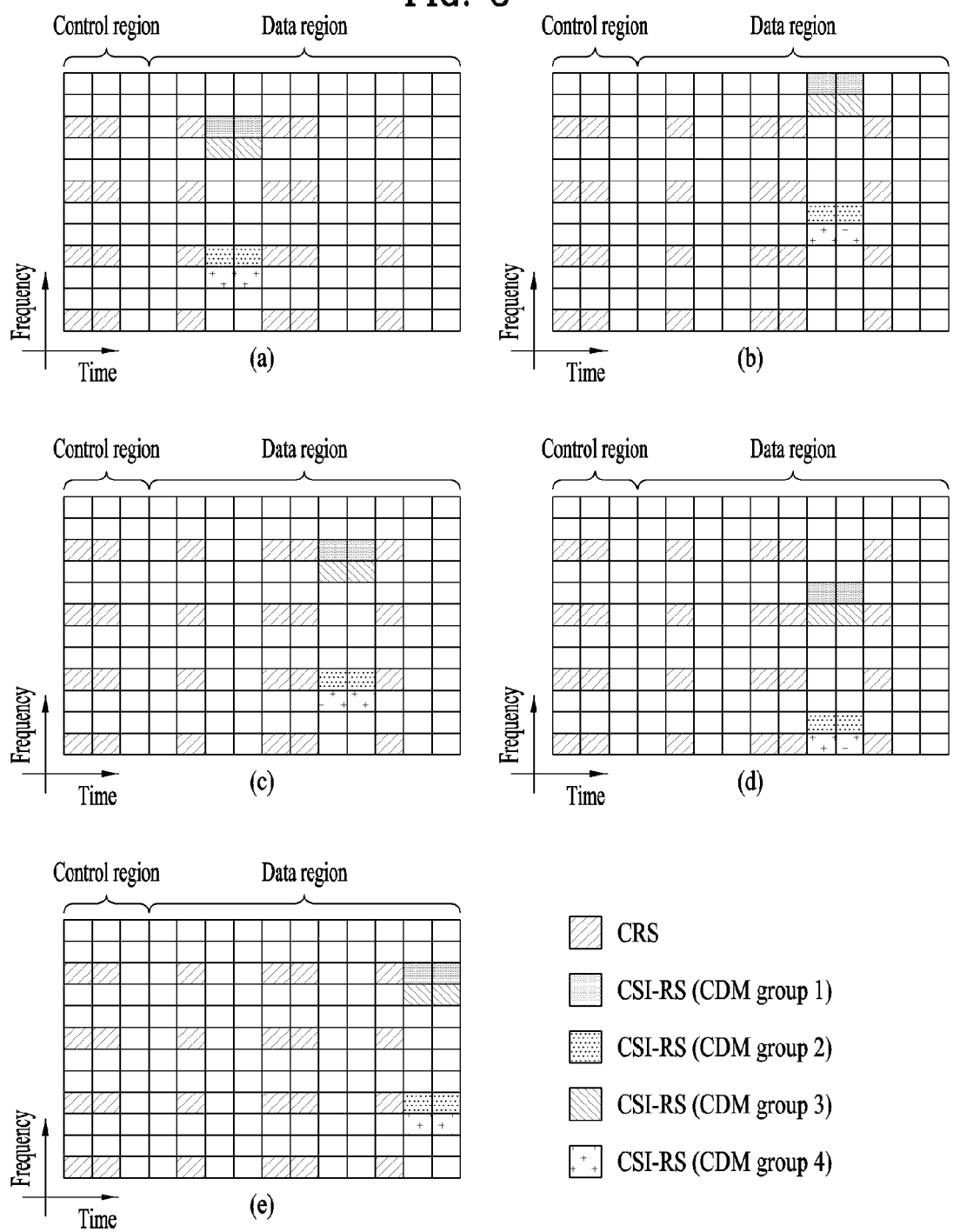
FIG. 8 is a diagram illustrating examples of a CSI-RS pattern.

FIG. 8 illustrates exemplary CSI-RS patterns defined for the LTE-A system. In FIG. 8, the positions of REs carrying CSI-RSs in an RB carrying downlink data (an RB having 14 OFDM symbols in time by 12 subcarriers in frequency in case of a normal CP) are marked. One of the CSI-RS patterns illustrated in FIGS. 8(a) to 8(e) is available for any downlink subframe. CSI-RSs may be transmitted for eight antenna ports supported by the LTE-A system, antenna port 15 to antenna port 22. CSI-RSs for different antenna ports may be identified by their different frequency resources (subcarriers) and/or different time resources (OFDM symbols). This means that the CSI-RSs may be multiplexed in FDM and/or TDM. CSI-RSs positioned in the same time-frequency resources for different antenna ports may be identified by their different orthogonal codes. That is, these DM RSs may be multiplexed in CDM. In the illustrated case of FIG. 8(a), CSI-RSs for antenna port 15 and antenna port 16 may be located on REs of CSI-RS CDM group 1 through multiplexing based on orthogonal codes. CSI-RSs for antenna port 17 and antenna port 18 may be located on REs of CSI-RS CDM group 2 through multiplexing based on orthogonal codes. CSI-RSs for antenna port 19 and antenna port 20 may be located on REs of CSI-RS CDM group 3 through multiplexing based on orthogonal codes. CSI-RSs for antenna port 21 and antenna port 22 may be located on REs of CSI-RS CDM group 4 through multiplexing based on orthogonal codes. The same principle described with reference to FIG. 8(a) is applicable to the CSI-RS patterns illustrated in FIGS. 8(b) to 8(e).

Figure 9:
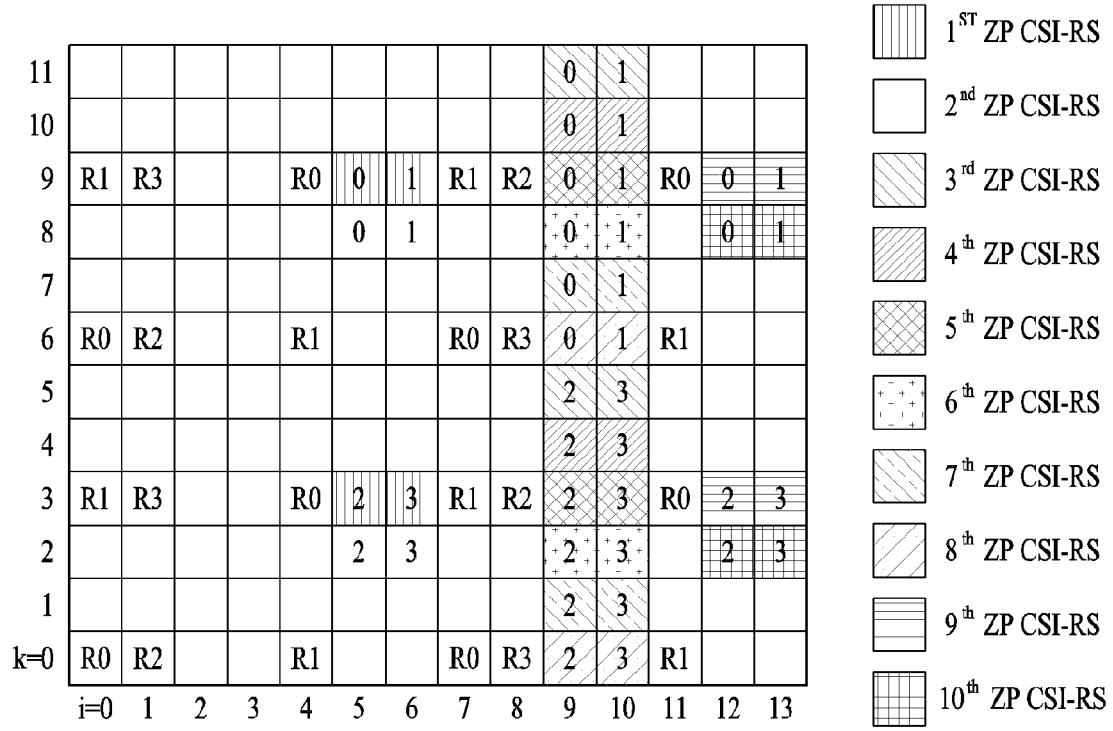
FIG. 9 is a diagram illustrating an example of a zero power (ZP) CSI-RS pattern.

FIG. 9 illustrates an example of a ZP (Zero Power) CSI-RS pattern, which is defined in the LTE-A system. The purpose of ZP CSI-RS is broadly divided into two purposes. A first purpose corresponds to a purpose for enhancing CSI-RS performance. More specifically, in order to enhance a CSI-RS measurement performance of another network, one network performs muting on a CSI-RS RE of the other network, and, then, in order to allow its own UE to be capable of correctly performing rate matching, the corresponding network may configure the muted RE to the ZP CSI-RS and may then notify such configuration. A second purpose corresponds to a purpose of performing interference measurement for CoMP CQI calculation. More specifically, part of the network performs muting on the ZP CRS-RS RE, and the UE may calculate the CoMP CQI by measuring the interference from this ZP CSI-RS.

The RS patterns illustrated in FIGS. 6, 7, 8 and 9 are purely exemplary. Thus it should be clearly understood that various embodiments of the present invention are not limited to specific RS patterns. That is, various embodiments of the present invention can also be implemented in the same manner when other RS patterns than those illustrated in FIGS. 6, 7 and 8 are applied.

Cooperative Multipoint Transmission/Reception (CoMP) System

CoMP (cooperative multipoint transmission/reception) is explained in the following description.

A system appearing after LTE-A has attempted to introduce a scheme of enhancing system performance by enabling a plurality of cells to cooperate with each other. Such a scheme is called a cooperative multipoint transmission/reception (hereinafter abbreviated CoMP). The CoMP refers to a scheme for two or more base stations, access points, or cells to cooperatively communicate with a specific user equipment for smooth communication between the user equipment and the base stations, the access points, or the cells. In the present invention, a base station, an access point, and a cell may have the same meaning.

In general, in a multi-cell environment having a frequency reuse factor set to 1, performance and average sector throughput of a user equipment located at a cell boundary may be lowered due to inter-cell interference (ICI). In order to reduce the ICI, a conventional LTE system has applied a method of providing an appropriate throughput performance to a user equipment located at a cell boundary in an environment restricted by interference using a simple manual scheme such as FFR (fractional frequency reuse) through UE-specific power control. However, reduction of the ICI or reuse of the ICI as a signal desired by a user equipment may be more preferable than lowering a frequency resource use per cell. In order to achieve the aforementioned purpose, the CoMP transmission scheme can be applied.

Figure 10:
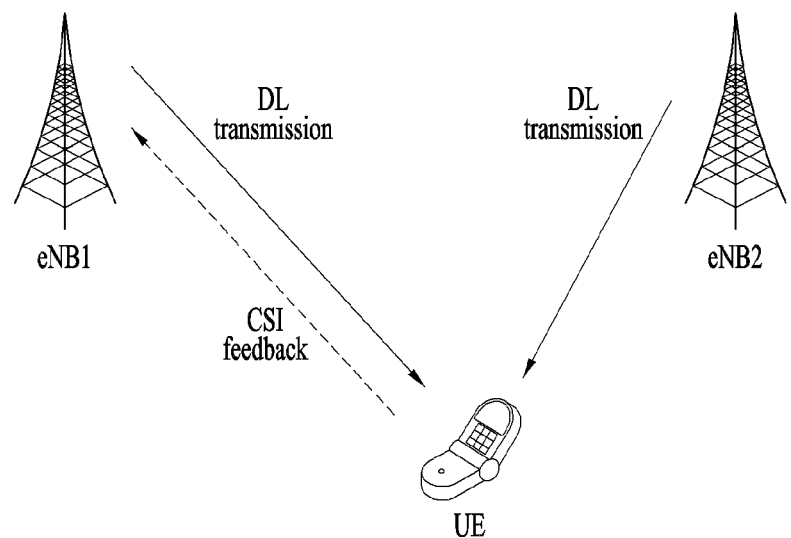
FIG. 10 is a diagram for one example of performing CoMP.

FIG. 10 is a diagram for one example of performing CoMP. Referring to FIG. 10, a wireless communication system includes a plurality of base stations (BS1, BS2 and BS3) performing CoMP and a user equipment. A plurality of the base stations (BS1, BS2 and BS3) performing the CoMP may efficiently transmit data to the user equipment by cooperating with each other.

The CoMP transmission scheme may be categorized into a join processing (COMP-joint processing, CoMP-JP) scheme in the form of cooperative MIMO through data sharing and a coordinated scheduling/beamforming (CoMP-coordinated scheduling/beamforming, CoMP-CS/CB) scheme.

According to the joint processing (CoMP-JP) scheme in downlink, a user equipment may simultaneously receive data from a plurality of base stations performing the CoMP transmission scheme. And, a reception performance can be enhanced in a manner of combining signals received from the base stations (joint transmission (JT)). And, it is also possible to consider a method of transmitting data to a user equipment on a specific timing by one of the base stations performing the CoMP transmission scheme (dynamic point selection (DPS)). On the other hand, according to the coordinated scheduling/beamforming method (CoMP-CS/CB), a user equipment may instantaneously receive data from a single base station i.e., a serving base station through a beamforming.

According to the joint processing (CoMP-JP) scheme in uplink, a plurality of base stations may simultaneously receive PUSCH signal from a user equipment (joint reception (JR)). On the other hand, according to the coordinated scheduling/beamforming method (CoMP-CS/CB), only a single base station may receive the PUSCH. In this case, the decision to use the coordinated scheduling/beamforming scheme is determined by the coordinating cells (or base stations).

CSI Feedback in CoMP System

A user equipment using the CoMP transmission scheme, that is, a CoMP UE may provide feedback of channel information (hereinafter referred to as CSI feedback) to a plurality of base stations that perform the CoMP transmission scheme. A network scheduler may select an appropriate CoMP transmission scheme for enhancing a transmission rate from CoMP-JP, CoMP-CS/CB, and DPS schemes based on CSI feedback. To this end, as a method for a CoMP UE to configure CSI feedback for a plurality of base stations that perform a CoMP transmission scheme, a periodic feedback transmission scheme using uplink PUCCH may be used. In this case, feedback configurations for the respective base stations may be independent from each other. Accordingly, according to an embodiment of the present invention, throughout this specification, a feedback operation of channel information using the independent feedback configuration is referred to as a CSI process. One or more CSI processes may exist in one serving cell.

FIG. 10 is a diagram for one example of performing CoMP.

Referring to FIG. 10, UE is located between eNB 1 and eNB 2 and two eNBs (i.e., eNB 1 and eNB 2) perform appropriate CoMP operations such as JT, DCS and CS/CB to solve interference to the UE. The UE performs appropriate CSI feedback to assist CoMP operations of the eNBs (base stations). Information transmitted through CSI feedback includes PMI information and CQI information of each eNB and may additionally include channel information (e.g., phase offset information between channels of the two eNBs) between the two eNBs for JT.

In FIG. 10, although the UE transmits a CSI feedback signal to the eNB 1 corresponding to its serving cell, the UE may transmit the CSI feedback signal to the eNB 2 or to both of the two eNBs depending on situations. Moreover, although in FIG. 10, eNB is described as a basic unit for joining CoMP, a transmission point controlled by eNB may become the basic unit for the CoMP as well.

For CoMP scheduling in a network, UE should provide feedback of downlink CSI of a neighboring eNB, which participates in the CoMP, as well as DL CSI of a serving eNB. To this end, the UE needs to provide feedback of a plurality of CSI processes, which reflect various data transmission eNBs and various interference environments.

Thus, an interference measurement resource (IMR) is used for interference measurement during a CoMP CSI calculation in LTE system. A plurality of IMRs may be configured for one UE, and one UE has independent configuration for each of the IMRs. In particular, period, offset and resource configuration of each IMR are independently configured and a base station may signal to UE through high layer signaling such as RRC (radio resource control) signaling or the like.

Moreover, in the LTE system, CSI-RS is used for channel measurement required during the CoMP CSI calculation. A plurality of CSI-RSs may be configured for one UE and each of the CSI-RSs has independent configuration. In particular, period, offset, resource configuration, power control (PC), and the number of antenna ports of each CSI-RS are independently configured. And, information related to CSI-RS may be signaled from a base station to UE through high layer signaling (e.g., RRC, etc.).

Among a plurality of the CSI-RSs and IMRs, which are configured for the UE, one CSI process may be defined in a manner of associating one CSI-RS resource for signal measurement with one IMR (interference measurement resource) for interference measurement. UE provides feedback with respect to each CSI, which is derived from different CSI processes, using an independent period and subframe offset.

In particular, each CSI process has independent CSI feedback configuration. Information on the association of the CSI-RS resource and the IMR resource, CSI feedback configuration and the like may be informed UE by a base station through high layer signaling such as RRC per CSI process. For example, it is assumed that three CSI processes are configured for UE as shown in Table 1.

TABLE 1

| CSI process | Signal Measurement Resource (SMR) | IMR |
| --- | --- | --- |
| CSI process 0 | CSI-RS 0 | IMR 0 |
| CSI process 1 | CSI-RS 1 | IMR 1 |
| CSI process 2 | CSI-RS 0 | IMR 2 |

In Table 1, CSI-RS 0 and CSI-RS 1 represent CSI-RS received from the eNB 1 corresponding to a serving base station (serving eNB) of the UE and CSI-RS received from the eNB 2 corresponding to a neighboring eNB participating in cooperation, respectively. It is assumed that IMR configured for each CSI process of Table 1 is configured as illustrated in Table 2.

TABLE 2

| IMR | eNB 1 | eNB 2 |
| --- | --- | --- |
| IMR 0 | Muting | Data transmission |
| IMR 1 | Data transmission | Muting |
| IMR 2 | Muting | Muting |

In IMR 0, the eNB 1 performs muting, the eNB 2 performs data transmission, and the UE is configured to measure interference from different eNBs except the eNB 1 on the IMR 0. Likewise, in IMR 1, the eNB 2 performs muting, the eNB 1 performs data transmission, and the UE is configured to measure interference from different eNBs except the eNB 2 on the IMR 1. Also, in IMR 2, both of the eNB 1 and the eNB 2 perform muting and the UE is configured to measure interference from different eNBs except both of the eNB 1 and the eNB 2 on the IMR 2.

Therefore, as shown in Table 1 and Table 2, CSI of CSI process 0 represents optimized RI, PMI and CQI information in the case of receiving data from the eNB 1. CSI of CSI process 1 represents optimized RI, PMI and CQI information in the case of receiving data from the eNB 2. CSI of CSI process 2 represents optimized RI, PMI and CQI information in the case that data is received from the eNB 1 and that there is no interference from the eNB 2.

Feedback of Interference Information in CoMP System

If a backhaul link delay between multiple TPs participating in cooperative transmission is large, it is difficult to perform dynamic cooperative transmission between the TPs. In other words, when the backhaul link delay is large, it takes a long time to initiate the cooperative transmission and it is difficult to respond to a channel state of the cooperative transmission immediately.

For instance, it is preferable that an interference TP performs muting at a specific timing. However, if the cooperative transmission is initiated after a long delay, CoMP gain is not large in spite of muting of the interference TP. In other words, a timing optimized for CoMP is missed due to channel aging caused by the time delay.

As mentioned in the foregoing description, the backhaul delay may have a critical effect on performance of the CoMP. Thus, in this specification, proposed is a method for UE to perform feedback by reflecting information necessary for coordination between base stations in CSI in case of a large backhaul delay. According to the present invention, it is advantageous in that information sharing between base stations can be performed rapidly and that sufficient CoMP performance can be obtained even if a backhaul delay is large.

Moreover, although the features of the present invention are described with reference to an example of DPB (dynamic point blanking), the present invention may be applied to other CoMP schemes.

Figure 11:
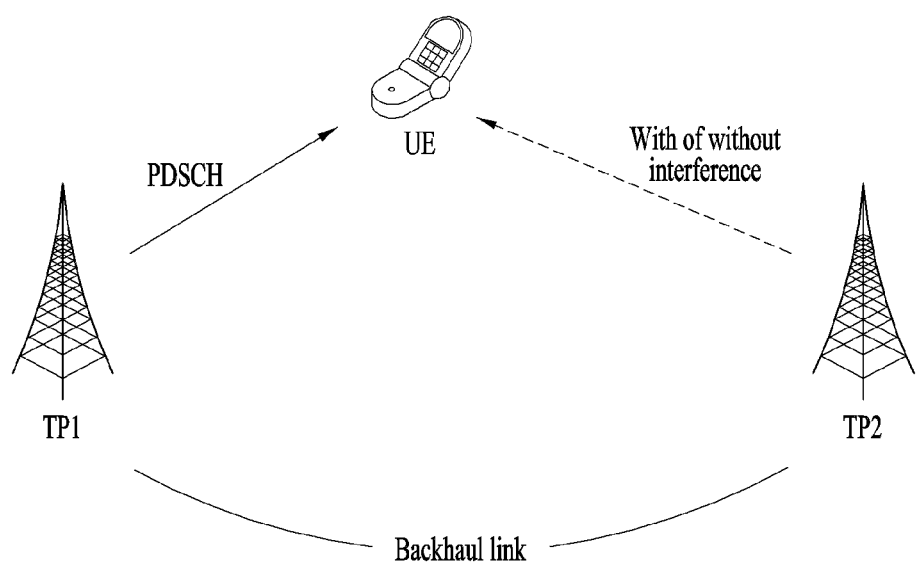
FIG. 11 is a diagram for one example of a DPB state.

FIG. 11 is a diagram for one example of a DPB state.

Referring to FIG. 11, TP 1 is a serving TP of UE. If muting is not performed, neighbor TP 2 causes interference to the UE. The TP 1 and TP 2 are connected to each other through backhaul of which delay is tens to hundreds of ms. For elimination of an interference channel, the TP 2 performs muting not to transmit PDSCH through a specific frequency-time resource predefined between base stations.

Figure 12:
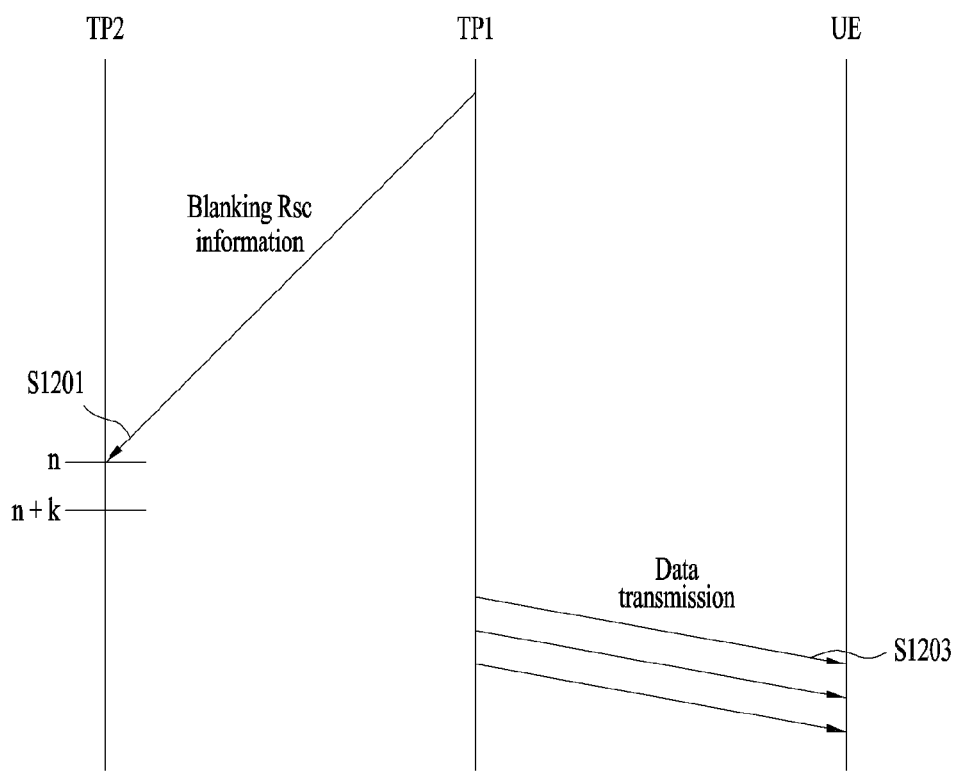
FIG. 12 is a diagram of a general information exchange process between TP 1, TP 2 and UE in case of performing DPB.

FIG. 12 is a diagram of a general information exchange process between TP 1, TP 2 and UE in case of performing DPB.

First of all, TP 1 determines a resource scheduled for UE and then transmits information on the determined resource to TP 2 through a backhaul [S1201]. Having received the resource information at n time, the TP 2 performs muting on the specific resource from predefined (n+k) time. In particular, if the TP 2 performs the muting, the TP 2 does not cause interference to the UE.

After (n+k) time, the TP 1 may transmit data to the UE without the interference from the TP 2 [S1203].

However, if a backhaul delay is large, performance of DPB may be degraded due to sharing of a blanking resource and occurrence of a delay in initiation of blanking. In particular, it may be difficult to apply DPB to a non-ideal backhaul environment, which has a large backhaul delay. Therefore, a method of performing DPB in a non-ideal backhaul environment is explained in the following description. According to an embodiment of the present invention, DPB can be performed through a backhaul between TP 1 and TP 2 without sharing blanking resource information.

First Embodiment

Signaling between interference TP and UE according to a first embodiment of the present invention is explained as follows.

Particularly, TP 2 transmits RB assignment information on its DL data to the UE.

The TP 2 transmits the RB assignment information to the UE through a control channel. Since a serving TP of the UE corresponds to TP 1, it may be difficult to establish PDCCH between the UE and the TP 2. Thus, the control channel may correspond to EPDCCH. In other words, the UE may receive the RB assignment information from the TP 2 in a manner of performing blind decoding (BD) on the EPDCCH. For instance, the system may operate in a manner that EPDCCH set 0 is used in the TP 1 and EPDCCH set 1 is used in the TP 2, exclusively. And, the UE detects the RB assignment information in the course of performing BD.

If the EPDCCH is used to share information for CoMP between TPs, it is efficient to adjust EPDCCH candidates of each EPDCCH set.

For example, if DCI for transmitting the above-mentioned RB assignment information is referred to as DCI format 2E, scheduling flexibility of a serving TP may be enhanced in a manner of considering a part of DCI including the DCI 2E as EPDCCH candidates in the set 1 and defining more EPDCCH candidates in the set 0.

Likewise, if it is restricted that only a part of aggregation levels is used in the set 1, the EPDCCH candidates in the set 1 may be reduced. For instance, since it is highly probable that a CoMP UE is located at a cell edge, the TP 2 may transmit EPDCCH in the set 1 using only a high aggregation level such as aggregation level 8 among whole aggregation levels.

Alternatively, EPDCCH candidates in each EPDCCH set may vary periodically. For example, in case of a normal subframe, 22 EPDCCH candidates are equally configured for the EPDCCH set 0 and the EPDCCH set 1. And, candidates in the set 0 and candidates in the set 1 may be operated based on a period of 5 ms in an asymmetrical manner. As an extreme example, based on the period of 5 ms, only the DCI 2E and a specific aggregation level may be used in the set 1 and more than 22 EPDCCH candidates may be configured for the set 0. It is also possible that the EPDCCH set 0 is used only in the normal subframe and both of the set 0 and set 1 may be used in a subframe, which appears at every period of 5 ms. In this case, the TP 2 transmits the RB assignment information in the subframe appearing at every period of 5 ms through the set 2.

The above-mentioned adjustment of the EPDCCH candidates in the EPDCCH set should be predefined between TPs. And, such information may be transmitted by a serving TP to UE through high layer signaling such as RRC or the like.

In order for the TP 2 to efficiently transmit the RB assignment information, new DCI may be defined. In particular, 1 bit of flag is assigned to a DCI field. And, if the flag is enabled, the rest of payload of DCI is predefined as the RB assignment information. If the flag is disabled, the rest of the payload may be filled with different information for the purpose of PDSCH scheduling or the like.

The RB assignment information may be limited to one of RB assignment patterns predefined between the TP 1, TP 2 and UE. For instance, the TP 2 may define RB assignment pattern 1 to transmit data only in an even-numbered RB and to perform muting on an odd-numbered RB and RB assignment pattern 2 to perform muting on an odd-numbered RB and to transmit data on an even-numbered RB. And, the TP 2 may share the patterns with the TP 1 and UE in advance. Thereafter, the TP 2 sets the RB assignment information as 1 bit and then transmits the RB assignment information to the UE according to the above-mentioned method.

The RB assignment information may be simply used as information for indicating whether blanking is performed on a specific subframe. For instance, if the TP 2 informs the UE that blanking is performed on a specific subframe, it may be predefined between the TP 2 and UE that blanking is performed on all RBs.

A CQI calculation method of UE according to the first embodiment of the present invention is explained as follows.

When UE provides feedback of subband CQI, the UE selects IMR used for CQI calculation based on the RB assignment information of the TP 2.

Figure 13:
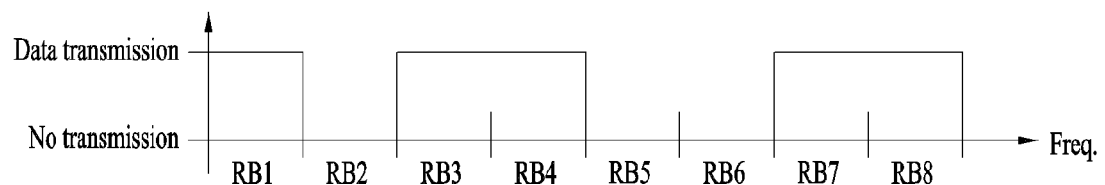
FIG. 13 is a diagram for an example of resource block assignment with respect to downlink data of a second cell.

For instance, the TP 2 performs data transmission on a specific subframe as shown in FIG. 13 and the UE is aware of RB on which data transmission is performed and RB on which data transmission is not performed, through the RB assignment information received from the TP 2. Referring to FIG. 13, the TP 2 does not transmit data in RBs 2, 5 and 6 and transmits data in RBs 1, 3, 4, 7, and 8 through PDSCH.

In this case, the UE may use two IMRs in order to separately calculate CQI in case of interference and CQI in case of no interference.

According to the related art, one IMR and one CSI-RS are configured for one CSI process. However, it is preferable that two IMRs and one CSI-RS are defined for one CSI process in order to perform DPB in a non-ideal backhaul environment. The two IMRs are referred to as IMR 1 and IMR 2, respectively. The IMR 1 is assumed to be IMR with interference from the TP 2 and the IMR 2 is assumed to be IMR without interference from the TP 2. The two IMRs may be prioritized. In particular, the UE uses the IMR 1 in calculating CSI of the above CSI process in general but uses the IMR 2 in a specific condition.

Alternatively, although one IMR and one CSI-RS are configured for one CSI process, the corresponding CSI process may be linked with a different CSI process. And, in a specific condition, CSI may be calculated using IMR of the linked CSI process (i.e., latter CSI process). In this case, IMR configured for the former CSI process is referred to as IMR 1 and IMR configured for the different CSI process, which is linked with the former CSI process, is referred to as IMR 2. As mentioned in the foregoing description, the UE may inherit part of information configured for another CSI process from one CSI process and then utilize it for a CSI calculation.

Figure 14:
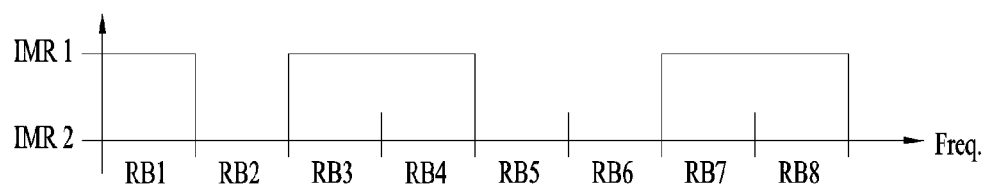
FIG. 14 is a diagram of IMR in each RB used by UE for a subband CSI calculation.

FIG. 14 is a diagram of IMR, used by UE for a subband CSI calculation, in each RB. CSI process 1 is previously configured for UE by TP 1 and CSI-RS, IMR 1 and IMR 2 of the TP 1 are used to define the CSI process 1. If the UE provides feedback of subband CSI to the TP 1, while a subband size is a single RB, the UE calculates CSI by selecting one of the IMR 1 and IMR 2. In particular, in RBs 2, 5 and 6, the UE calculates CSI by measuring an interference signal using the IMR 2 and in RBs 1, 3, 4, 7, and 8, the UE calculates CSI by measuring an interference signal using the IMR 1.

A scheduling process of TP 1 (i.e., serving TP) according to the first embodiment of the present invention is explained as follows.

The TP 1 receives the feedback of the calculated subband CSI from the UE. The TP 1 performs scheduling based on CSI in which frequency selective blanking of the TP 2 is reflected. Although the TP 1 may not be sure which subband is not affected by interference from the TP 2, the TP 1 performs DPB during a dynamic scheduling process.

For the above-mentioned operation, it is preferable that the TP 2 operates RB assignment semi-statically. If the TP 2 transmits data by dynamically performing new RB assignment in each subframe unlike FIG. 14, the subband CSI fed back by the UE is outdated and is not valid. Moreover, by transmitting a time for which the RB assignment information transmitted to UE through EPDCCH between the TP 1, TP 2 and UE is maintained, a problem that CSI is outdated can be avoided.

An operation of CSI feedback provided to the TP 1 by the UE periodically (periodic feedback) according to the first embodiment of the present invention is explained as follows.

By providing feedback of 1-bit toggle indicator to the TP 1, the UE reports whether the TP 2 performs a blanking operation. If the UE receives the RB assignment information from the TP 2 and then performs CSI feedback with reference to the RB assignment information, the UE informs the TP 1 that the TP 2 starts blanking on a specific resource in a manner of setting (enabling) the indicator to 1. If the indicator is set to 0, it may be considered that the TP 2 does not perform blanking on the specific resource.

The indicator may be fed back together with subband CQI through the same subframe. For instance, if CQI of subband 1 and the indicator set to 1 (i.e., indicator=1) are fed back, the TP 1 may know that the TP 2 performs blanking on the subband 1. If CQI of the subband 1 and the indicator set to 0 (i.e., indicator=0) are fed back again, the TP 1 may know that the TP 2 does not perform blanking on the subband 1.

The indicator may fed back together with RI or w1 through the same subframe. For instance, if RI and the indicator set to 1 (i.e., indicator=1), the UE provides feedback of subband CQI with respect to only a subband on which the TP 2 performs blanking. Alternatively, the UE calculates subband CQI with respect to all subbands but it may be predefined that the UE feeds lowest CQI back with respect to a subband on which blanking is not performed. In this case, the base station may consider a subband in which CQI is fed back instead of the lowest CQI as the subband on which the TP 2 performs blanking.

An operation of CSI feedback provided to the TP 1 by the UE non-periodically (periodic feedback) according to the first embodiment of the present invention is explained as follows.

Having calculated CSI according to the proposed method, the UE may transmit the CSI through TP 1 PUSCH, which appears at first. Moreover, if information carried on EPDCCH of the PT 2 includes information for indicating until when the TP 2 performs muting, such muting pattern information may be transmitted together (e.g., an indicator may be added to an MAC header). Original data to be transmitted through the PUSCH may be transmitted together with the CSI or through next PUSCH.

Second Embodiment

According to the first embodiment, each of CSI with interference from the TP 2 and CSI without interference from the TP 2 are calculated using two IMRs according to the first embodiment. However, according to a second embodiment, the calculation method can be performed using one IMR. In this case, it should be guaranteed that when TP 1 and TP 2 use a single IMR, the TP 2 causes interference to a specific frequency-time resource and does not cause interference on the rest of resources. And, such information should be transmitted to UE.

For instance, the UE may be notified of a resource affected by interference from the TP 2 as IMR averaging window 1 and a resource having no interference from the TP 2 as IMR averaging window 2. Having obtained RB assignment information of the TP 2, the UE uses the window 1 in calculating subband CSI of RB having data of the TP 2 and the window 2 in calculating subband CSI of the rest of RBs.

If one CSI-RS and one IMR are available for one CSI-process similar to the related art, the UE may perform the above operation in a manner of emulating the interference caused by the TP 2 for each subband.

Having received the RB assignment information of the TP 2 as shown in FIG. 13, the UE detects a process having QCL-performed CSI-RS on an EPDCCH set of the TP 2 from CSI processes. If a plurality of the processes exist, the UE feeds back CQI in which blanking of the TP 2 is reflected using a CSI process having a lowest index among the processes. This CSI process is referred to as CSI process 2. And, CSI-RS of the TP 2 and IMR having no interference from the TP 1 and TP 2 are used for the CSI process 2.

In the case of RBs 2, 5 and 6 without interference from the TP 2, CQI is calculated based on interference measured using IMR of the process 2. In the case of RBs 1, 3, 4, 7, and 8, CQI is calculated in a manner of estimating interference as follows.

The UE may calculate interference according to the following equation. A channel $\hat{H}_2$ of the TP 2 is estimated based on CSI-RS of the CSI process 2. In this case, since PMI used by the TP 2 is unknown, the UE estimates a reception signal from the TP 2 on the assumption that the TP 2 uses beam existing in a random codebook equally. It is also assumed that the codebook includes codewords, which are uniformly distributed on Euclidean space corresponding to a channel dimension.

$$\text{Interference} = \text{interference measured from the } IMR \text{ of } CSI \text{ process } 2 + \sqrt{\frac{\alpha}{N} \sum_{i=1}^{N} \hat{H}_2 PMI_{2i} G} \quad \text{[Equation 12]}$$

In Equation 12, α indicates a power ratio between CSI-RS and PDSCH, PMI2i indicates a codeword used when assuming a precoder of the TP 2, N indicates the number of codewords, and G indicates a complex Gaussian random variable with mean=0 and variance=1.

Having estimated interference according to Equation 12, the UE calculates interference power based on the estimated interference value and then calculates CQI.

Alternatively, the UE may calculate interference power using the following equation.

$$\text{Interference power} = \|\text{interference measured from the } IMR \text{ of } CSI \text{ process } 2\|^2 + \frac{\alpha}{N} \sum_{i=1}^{N} \|\hat{H}_2 PMI_{2i}\|^2 \quad \text{[Equation 13]}$$

Although interference is measured using IMR configured for a CSI process (i.e., CSI process 2) of an interference cell according to the above-mentioned description, interference may be measured using IMR configured for a CSI process (i.e., CSI process 1) of a serving cell according to another operating method of the present invention.

A serving base station (i.e., TP 1) configures the CSI process 1 for UE. And, the CSI process 1 is composed of serving CSI-RS transmitted by the TP 1 and IMR for muting both of the serving base station and interference base station (i.e., TP 2). Having received the RB assignment information of the TP 2 as shown in FIG. 13, the UE detects the QCL-performed CSI-RS on the EPDCCH set of the TP 2.

Thereafter, in RBs 2, 5 and 6 without interference from the TP 2, the UE calculates CQI based on interference measured using IMR of the process 1 and in RBs 1, 3, 4, 7, and 8 affected by interference from the TP 2, the UE calculates CQI by estimating interference according to Equation 14 or 15 in the following

[Equation 14]

$$\text{Interference} = \text{interference measured from the } IMR \text{ of } CSI \text{ process1} + \sqrt{\frac{\alpha}{N} \sum_{i=1}^{N} \hat{H}_2 PMI_{2i} G}$$

[Equation 15]

$$\text{Interference power} =$$
$$\|\text{interference measured from the } IMR \text{ of } CSI \text{ process1}\|^2 +$$
$$\frac{\alpha}{N} \sum_{i=1}^{N} \|\hat{H}_2 PMI_{2i}\|^2$$

In Equations 14 and 15, α indicates a power ratio between CSI-RS and PDSCH, PMI2i indicates a codeword used when assuming a precoder of the TP 2, N indicates the number of codewords, and G indicates a complex Gaussian random variable with mean=0 and variance=1. And, $\hat{H}_2$ indicates a channel estimated from the QCL-performed CSI-RS on the EPDCCH set of the TP 2.

Meanwhile, in the first embodiment and second embodiment according to the present invention, an amount of interference reflected in CQI is differently measured depending on whether the TP 2 performs blanking. According to the first embodiment, CQI is calculated in a manner of selecting one of two IMRs depending on presence or non-presence of blanking. And, according to the second embodiment, although one IMR is used, interference from the TP 2 is emulated depending on presence or non-presence of blanking. In particular, the TP 2 informs the UE of a scheme of measuring an amount of interference or a resource for interference measurement and the UE calculates CQI according to a command from the TP 2. Moreover, it may be applied to various kinds of CoMP schemes as well as to DPB.

For instance, even if the TP 2 performs coordinated beamforming instead of blanking, the present invention may be utilized. In particular, if the TP 2 uses a specific resources for PMI2, the TP 2 informs the UE of related information. When calculating CQI of the specific resource, the UE uses IMR, which is affected through the PMI2 by interference from the TP 2. When calculating CQI of resources except the specific resource, the UE uses different IMR, which is affected through random PMI by interference from the TP 2.

Alternatively, when calculating CQI of the corresponding resource, the UE emulates interference by multiplying PMI2 with a channel of the TP 2 and then calculates CQI by adding interference measured using IMR. In case of other resources, the UE may calculate CQI using IMR only.

Figure 15:
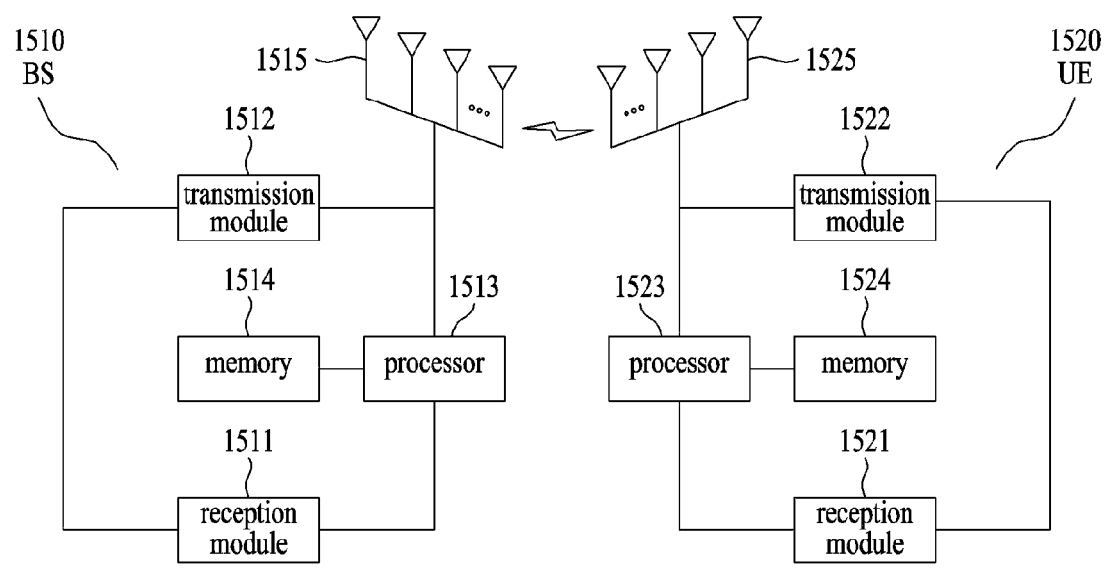
FIG. 15 is a diagram for examples of a base station and a user equipment applicable to one embodiment of the present invention.

FIG. 15 is a diagram for examples of a base station and a user equipment applicable to one embodiment of the present invention.

If a relay node is included in a wireless communication system, a communication in backhaul link is performed between a base station and the relay node and a communication in access link is performed between the relay node and a user equipment. Therefore, the base station or user equipment shown in the drawing can be substituted with the relay node in some cases.

Referring to FIG. 15, a wireless communication system includes a base station 1510 and a user equipment 1520. The base station 1510 includes a processor 1513, a memory 1514 and an RF (radio frequency) unit 1511 and 1512. The processor 1513 can be configured to implement the procedures and/or methods proposed by the present invention. The memory 1514 is connected to the processor 1513 and stores various kinds of informations related to operations of the processor 1513. The RF unit 1516 is connected to the processor 1513 and transmits and/or receives radio or wireless signals. The user equipment 1520 includes a processor 1523, a memory 1524 and an RF unit 1521 and 1522. The processor 1523 can be configured to implement the procedures and/or methods proposed by the present invention. The memory 1524 is connected to the processor 1523 and stores various kinds of informations related to operations of the processor 1523. The RF unit 1521 and 1522 is connected to the processor 1523 and transmits and/or receives radio or wireless signals. The base station 1510 and/or the user equipment 1520 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like.

Embodiments of the present invention may be implemented using various means. For instance, embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor.

The memory unit may be provided within or outside the processor to exchange data with the processor through the various means known to the public.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. For instance, the respective configurations disclosed in the aforementioned embodiments of the present invention can be used by those skilled in the art in a manner of being combined with each other. Therefore, the present invention is non-limited by the embodiments disclosed herein but intends to give a broadest scope that matches the principles and new features disclosed herein.

It will be apparent to those skilled in the art that the present invention may be embodied in other specific forms without departing from the spirit and essential characteristics of the invention. Thus, the above embodiments should be considered in all respects as exemplary and not restrictive. The scope of the present invention should be determined by reasonable interpretation of the appended claims and the present invention covers the modifications and variations of this invention that come within the scope of the appended claims and their equivalents. The present invention is non-limited by the embodiments disclosed herein but intends to give a broadest scope that matches the principles and new features disclosed herein. And, it is apparently understandable that an embodiment is configured by combining claims failing to have relation of explicit citation in the appended claims together or can be included as new claims by amendment after filing an application.

INDUSTRIAL APPLICABILITY

The present invention can be applied to various wireless communication devices including a user equipment, a relay, a base station and the like.

What is claimed is:

1. A method for reporting channel state information (CSI) by a user equipment in a wireless communication system, the method comprising:
    receiving a resource block assignment information on downlink data of a second cell from the second cell adjacent to a first cell corresponding to a serving cell;
    selecting either a first IMR (interference measurement resource) having interference from the second cell or a second IMR without the interference from the second cell based on the resource block assignment information; and
    transmitting a CQI (channel quality indicator) calculated based on the selected IMR to the first cell, and
    wherein the resource block assignment information is determined as either a first pattern information to transmit data only in even-numbered resource blocks and to perform first muting on odd-numbered resource blocks, or a second pattern information to transmit the data only in the odd-numbered resource blocks and to perform second muting on the even-numbered resource blocks.

2. The method of claim 1, further comprising:
    receiving a DCI (downlink control information) including a 1-bit flag,
    wherein if the 1-bit flag corresponds to a first value, a remaining payload of the DCI comprises the resource block assignment information, and
    wherein if the 1-bit flag corresponds to a second value, the remaining payload of the DCI comprises scheduling information.

3. The method of claim 1, further comprising:
    transmitting indication information on presence or non-presence of the first muting or the second muting.

4. The method of claim 3,
    wherein the indication information is transmitted in a same subframe as the CQI.

5. The method of claim 1,
    wherein the resource block assignment information is received through an EPDCCH (Enhanced Physical Downlink Control Channel).

6. The method of claim 1,
    wherein after a precoding matrix index (PMI) is received from the second cell, the PMI is transmitted to the first cell through a first PUSCH (Physical Uplink Shared Channel).

7. A user equipment for reporting a CSI (Channel State Information) in a wireless communication system, the user equipment comprising:
    a radio frequency (RF) unit; and
    a processor,
    wherein the processor is configured to:
    control the RF unit to receive a resource block assignment information on downlink data of a second cell from the second cell adjacent to a first cell corresponding to a serving cell,
    select either a first IMR (Interference Measurement Resource) having an interference from the second cell or a second IMR without the interference from the second cell based on the resource block assignment information, and
    control the RF unit to transmit a CQI (Channel Quality Indicator) calculated based on the selected IMR to the first cell,
    wherein the resource block assignment information is determined as either a first pattern information to transmit data only in even-numbered resource blocks and to perform first muting on odd-numbered resource blocks, or a second pattern information to transmit the data only in the odd-numbered resource blocks and to perform second muting on the even-numbered resource blocks.

8. The user equipment of claim 7,
    wherein the processor is further configured to control the RF unit to receive a DCI (downlink control information) including a 1-bit flag,
    wherein if the 1-bit flag corresponds to a first value, a remaining payload of the DCI comprises the resource block assignment information, and
    wherein if the 1-bit flag corresponds to a second value, the remaining payload of the DCI comprises scheduling information.

9. The user equipment of claim 7,
wherein the processor is further configured to control the RF unit to transmit indication information on presence or non-presence of the first muting or the second muting.

10. The user equipment of claim 9,
wherein the indication information is transmitted in a same subframe as the CQI.

11. The user equipment of claim 7,
wherein the resource block assignment information is received through an EPDCCH (Enhanced Physical Downlink Control Channel).

12. The user equipment of claim 7,
wherein after a precoding matrix index (PMI) is received from the second cell, the PMI is transmitted to the first cell through a first PUSCH (Physical Uplink Shared Channel).

* * * * *